United States Patent [19]

Ohsugi et al.

[11] Patent Number: 5,066,720
[45] Date of Patent: Nov. 19, 1991

[54] RESINOUS COMPOSITION FOR COATING USE

[75] Inventors: Hiroharu Ohsugi; Akihiro Kanakura, both of Osaka; Hirotoshi Umemoto, Kyoto; Yoshio Okamura, Gunma; Mitsuhiro Takarada, Gunma; Kenji Yamamoto, Gunma, all of Japan

[73] Assignees: Nippon Paint Co., Ltd., Osaka; Shinetsu Chemical Industries, Ltd., Tokyo, both of Japan

[21] Appl. No.: 313,231

[22] Filed: Feb. 21, 1989

[30] Foreign Application Priority Data

Feb. 19, 1988 [JP] Japan .................. 63-38311

[51] Int. Cl.$^5$ .................................. C08F 8/00
[52] U.S. Cl. .................. 525/100; 525/443; 525/446; 525/476; 525/440; 525/523
[58] Field of Search ........... 525/100, 443, 446, 476, 525/523, 440

[56] References Cited

U.S. PATENT DOCUMENTS 4,278,574 7/1981 Dworak et al. ............ 525/446
4,764,569 8/1988 Umemoto et al. ........... 525/446

Primary Examiner—Melvyn I. Marquis

Attorney, Agent, or Firm—Wenderoth, Lind & Ponack

[57] ABSTRACT

A resinous composition for coating use comprising
(a) 3 to 70% by weight of organopolysiloxane represented by the formula:

$$R^1{}_n R^2{}_m SiO_{(4-n-m)/2}$$

wherein $R^1$ represents hydrogen, allyloxy group, an alkoxy group having 1 to 20 carbon atoms, an aryl group, methyl group, or an organic group having 2 to 100 carbon atoms; $R^2$ is a hydroxyl group bearing organic group having 2 to 100 carbon atoms; m and n each represents a positive number fulfilling the requirements of $0<n<4$, $0<m<4$ and $2\leq m+n<4$, having a number average molecular weight of 200 to 100,000 and a hydroxyl value of 20 to 400.
(b) 97 to 30% by weight of hydroxyl group containing resin having a hydroxyl value of 20 to 300, and
(c) crosslinking agent which is reactive with a hydroxyl group This composition is particularly useful in the area where durability and weather resistance of the formed coating are specifically required.

11 Claims, No Drawings

RESINOUS COMPOSITION FOR COATING USE

FIELD OF THE INVENTION

The present invention relates to a resinous composition for coating use and more specifically, it concerns a resinous composition containing an alcoholic hydroxyl group bearing polysiloxane and being particularly useful in the area where durability and weather resistance of the formed coating are specifically required.

BACKGROUND OF THE INVENTION

Though a polysiloxane resin is excellent in thermal resistance, water repellency, weather resistance and the like, it has never been used alone because of its poor mechanical strength. Therefore, attempts have been made to use this resin for the modification of other kinds of resins such as acrylic resin, polyester resin or the like, thereby making the most of the excellent properties of said resin. However, in the heretofore proposed modification means, use is made of the reaction between silanol or alkoxy group contained in the polysiloxane resin and hydroxyl group contained in the organic base resin such as acrylic or polyester resin. Therefore, both resins are always connected with each other through Si—O—C bonding. Nevertheless, this Si—O—C bonding is liable to be easily hydrolyzed and hence the siloxane resin is regenerated by hydrolysis and gradually removed off, resulting in the decrease in corrosion resistance, weather resistance, stain resistance and the like of the coating.

In Japanese Patent Publication (unexamined) Sho 58-217515, Japanese Patent Publication Sho 58-58123 and the like, there has been proposed a modification of urethane resin with dimethylpolysiloxane having at both ends alcoholic hydroxyl groups. However, this leaves much to be desired because the crosslinking density is comparatively low and hence the surface hardness and mechanical strength of the formed coating are fairly of a lower order.

In Japanese Patent Publication Sho 60-1886 and 63-23212, there is an another proposal such that plural alcoholic hydroxyl groups are located at the side chain portions of polysiloxane resin, thereby increasing the crosslinking density. However, such resin can not be added in a quantity to the organic base resin because of its poor compatibility and hence it is hardly possible to obtain a thoroughly modified uniform resin.

It is, therefore, an object of the invention to provide measures for incorporating strongly a quantity of silicone resin into a base resin and provide a resinous composition for coating use by making use of said measures. It is an additional object of the invention to provide a resinous composition which is useful in a coating composition capable of resulting in a coating with excellent durability and weather resistance.

SUMMARY OF THE INVENTION

According to the invention, the aforesaid objects can be attained with a resinous composition for coating use comprising (a) 3 to 70% by weight of organopolysiloxane represented by the formula:

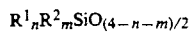

wherein $R^1$ represents hydrogen, allyloxy group, an alkoxy group having 1 to 20 carbon atoms, an aryl group, methyl group, or an organic group having 2 to 100 carbon atoms; $R^2$ is a hydroxyl group bearing organic group having 2 to 100 carbon atoms; m and n each represents a positive number fulfilling the requirements $0<n<4$, $0<m<4$ and $2 \leq m+n<4$, having a number average molecular weight of 200 to 100,000 and a hydroxyl value of 20 to 400, (b) 97 to 30% by weight of hydroxyl group containing resin having a hydroxyl value of 20 to 300, and (c) crosslinking agent which is reactive with a hydroxyl group.

$R^1$ of the organopolysiloxane represented by the formula hereinabove mentioned and used in the present invention is hydrogen, allyloxy group, an alkoxy group having 1 to 20 carbon atoms, an aryl group or an organic group having 2 to 100 carbon atoms, and $R_2$ must be a hydroxyl group bearing organic group having 2~100 carbon atoms.

In this invention, the term "organic group having 2 to 100 carbon atoms" shall mean "residue of an organic compound having 2~100 methylene groups in its main chain which may be interrupted with ester bonding, ether bonding, urethane bonding or carbon-carbon unsaturation bonding and which may contain functional groups other than hydroxyl group."

Such polysiloxane may be advantageously prepared by first obtaining a cyclic siloxane represented by the formula:

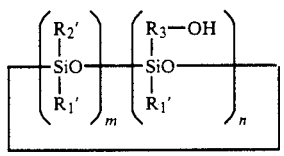

(in which $R_3$ is an alkylene chain having 2 to 100 carbon atoms and optionally containing ether and/or ester bonding in the chain) by the method wherein a siloxane of the formula:

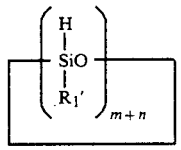

is reacted with m moles of alkylene in the presence of a platinic acid catalyst to obtain the compound of the formula:

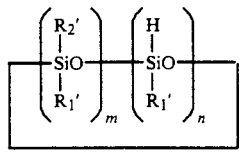

which is then subjected to an addition reaction with n moles of alkeneoxytrialkylsilane in the presence of a platinic acid catalyst to obtain the compound of the formula:

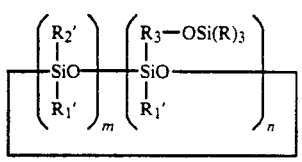

and hydrolyzed to

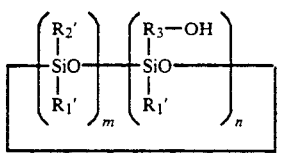

and then subjecting the thus obtained cyclic siloxane ring-opening polymerization by using heat and/or catalyst means. As the catalyst, the following may be advantageously used: conc.sulfuric acid, alkali metal hydroxide or silanolate, quaternary ammonium hydroxide and the like. During the polymerization, it is also possible to use the siloxane compound of the formula:

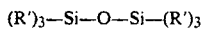

in which R' is an alkyl group having 1 to 3 carbon atoms, which may include a hydroxyl group.

Alternatively, said polysiloxane may be prepared by reacting a polysiloxane of the formula:

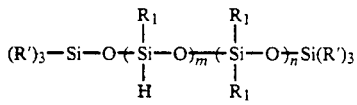

with m moles of alkeneoxytrimethylsilane in the presence of a platinic acid catalyst to give the compound of the formula:

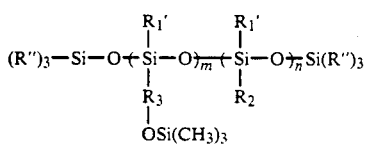

which is then hydrolyzed to give a compound of the formula:

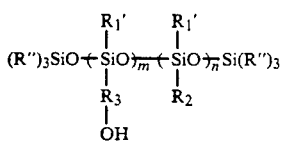

It is also possible to extend the chain length of —R$_3$—OH by reacting it with ε-caprolactone in the presence of a catalyst such as tetrabutyltitanate and the like, thereby improving the compatibility of thus formed organopolysiloxane with an acrylic or polyester resin. From the standpoint of production ease and excellent performance characteristics, particularly preferred organopolysiloxanes are such members represented by the formula:

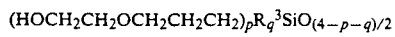

in which p and q each represents a positive number fulfilling the requirements of $0 < p \leq 2$, $0 < q \leq 2$ and $1 < p+q < 3$; and $R^3$ is a substituted or unsubstituted monovalent hydrocarbon residue.

When represented by the structural formula, particularly preferable organopolysiloxanes used in the present invention shall be given by the formula:

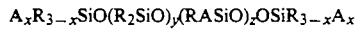

in which x is 0 or 1, y and z each represents a positive number fulfilling the requirements of $1 \leq y \leq 20$, $1 \leq z \leq 10$, R is methyl, propyl or phenyl, and A is $HOCH_2CH_2OCH_2CH_2CH_2$ group.

For a better compatibility of the resin with the organic base resins, 10 to 50 mole % of R should preferably be a phenyl group.

More specifically, the abovementioned preferable members include the following:

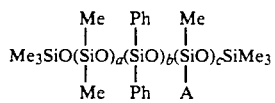

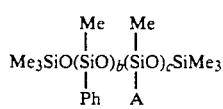

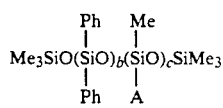

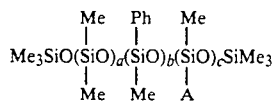

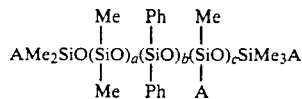

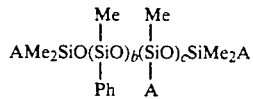

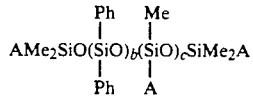

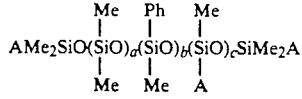

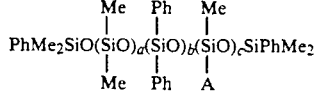

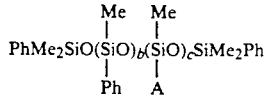

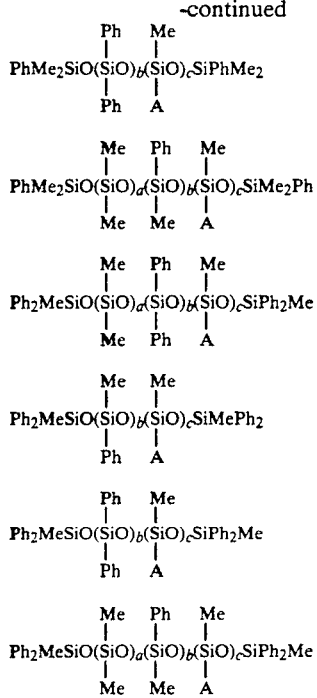

In these formulas, Ph stands for phenyl and Me is a methyl group, and a represents O or a positive integer, and b and c are each a positive integer.

Number average molecular weight of such organopolysiloxane should preferably be in a range of 200 to 100,000, and most preferably 500 to 20,000. If it is less than 200, sufficient mechanical strength at the coating surface can not be obtained, whereas if it is more than 100,000, sufficiently cured coating can not be obtained because of its poor compatibility with the hydroxyl group containing resin and the crosslinking agent.

Hydroxyl value of the organopolysiloxane measured by the method of JIS K8004 should preferably be in a range of 20 to 400, and most preferably 50 to 200. This is because if the hydroxyl value is less than 20, such siloxane compound can hardly react with the hardening agent, resulting in deficient curing and poor mechanical properties of the coating. Whereas, when the hydroxyl value of the organopolysiloxane is more than 200, there is a problem of poor compatibility with the hydroxyl group containing resin and the crosslinking agent, resulting in deficient curing of the coating, too.

The hydroxyl group containing resin used with the abovementioned polysiloxane in the present invention may be any resin customarily used in the paint field, providing it has a hydroxyl value of 20 to 300. Examples are acrylic resin, alkyd resin, polyester resin, epoxy resin, aminoplast resin, acryl modified alkyd resin, acryl modified polyester resin and the like.

Among them, particularly preferable members are acrylic resins obtained by the copolymerization of hydroxyalkyl(meth)acrylate and (meth)acrylic acid, (meth)acrylate or the like, epoxy resins obtained by the reaction of bisphenol A and epichlorohydrine and polyester resins obtained by the reaction of polycarboxylic acid and a polyol polycondensation product.

As the crosslinking agent which is another component used with the present polysiloxane and hydroxyl group containing resin, any of the known crosslinking agents may be satisfactorily used, providing it has two or more functional groups reactive with a hydroxyl group. The role of this crosslinking agent is to crosslink the abovementioned organopolysiloxane with organic resin, organopolysiloxane with other organopolysiloxane, and organic resin with other organic resin at room temperatures or under heating conditions. More specifically, such crosslinking agents are polyisocyanate compounds, melamine-formaldehyde resins, dibasic acid anhydrides and the like.

As to the compounding ratio of these components, it may vary in a wide range of 3 to 70% by weight of hydroxyl group containing weight of hydroxyl group containing resin. More preferably, the former is in a range of 5 to 40% by weight and the latter is 95 to 60% by weight.

The inventors have found that if the content of polysiloxane is less than 3% by weight, it is impossible to expect the characteristic properties of the polysiloxane in full, and if it is more than the upper limit of 70% by weight, there is a tendency that compatibility of polysiloxane with the said hydroxyl containing resin will be lowered and hence a fully cured coating can not be obtained.

In this invention, the functional groups contained in the crosslinking agent are reacted with hydroxyl groups of said polysiloxane and hydroxyl group containing resin, thereby resulting in a three dimensionally crosslinked polymer structure having improved mechanical strength. At that time, said crosslinking agent is used in an appropriate amount so as to give the desired degree of crosslinking. Thus, in the present invention, particular organopolysiloxane and particular hydroxyl-group-containing resin are used together each in defined amounts. However, if desired, all or part of said organopolysiloxane and hydroxyl group containing resin may be previously reacted and combined together, before being compounded with the said crosslinking agent. For example, the present polysiloxane having a hydroxyalkyl group may be reacted with a compound having both unsaturated double bonding and a functional group other than hydroxyl such as, for example, maleic anhydride, methacryloyl isocyanate and the like, to obtain polysiloxane having unsaturated double bonding in its side chain, which is then copolymerized with other α, β-unsaturated acrylic or vinyl monomers.

Thus, in the present invention, differing from the heretofore proposed surface controlling silicone oil, the content of polysiloxane in the resinous composition may be easily controlled a and comparatively larger quantity of such polysiloxane can be firmly incorporated into the resinous composition and therefore, a quite attractive, novel crosslinked product, which may keep its excellent water repellency for a long time and is excellent in weather resistance and durability can be obtained.

In the heretofore known silicone modified acrylic or polyester resins, the modification is usually carried out by the method wherein an organopolysiloxane having silanol or alkoxy groups and a hydroxyl group containing organic resin are heated in the presence of a catalyst such as alkyl titanate, zinc octate and the like. Therefore, said organopolysiloxane is incorporated into the organic resin through Si—O—C bonding, which is easily hydrolyzed under ionic atmosphere. Whereas, in the present invention, crosslinking occurs between the functional groups of the crosslinking agent and hydroxyl groups of the polysiloxane and of the organic resin, and therefore, the bonding included in the crosslinking is either one of ester bonding, ether bonding and urethane bonding, which are stable and hardly affected by hydrolysis.

Thus, in the present invention, while maintaining the characteristic properties possessed by siloxane compound, i.e. excellent gas and ion permeabilities, thermal resistance and water repellency, the formed novel crosslinked product whose properties are far better than those of heretofore known resinous compositions can be obtained. Therefore, the present resinous composition is very useful as a resinous vehicle for coating composition capable of resulting in a coating with excellent durability, weather resistance and corrosion resistance.

The invention shall be now more fully explained in the following Examples. Unless otherwise stated, all parts and percentages are by weight.

MANUFACTURING EXAMPLE 1

Preparation of Polysiloxan Resin Solution A

A mixture of 40 parts of

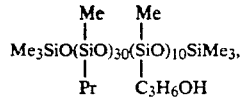

10 parts of xylene, 4 parts of maleic anhydride and 0.5 part of dibutyl tin oxide was reacted at 130° C. for 1 hour to obtain a polysiloxane resin solution A. The progress of the reaction was traced by checking the resinous acid value. It was found that the reaction was thoroughly completed in 1 hour.

MANUFACTURING EXAMPLE 2

Preparation of silicone modified acrylic resin solution B

In a reaction vessel, 70 parts of xylene were placed and maintained at 70° C. To this, was added dropwise a mixture of 20 parts of styrene, 38 parts of Placcel FM-1 (addition product of 2-hydroxyethyl methacrylate and $\epsilon$-caparolactone, trade mark of Daicel Chem. Co.), 25 parts of methyl methacrylate, 15 parts of 2-ethylhexyl methacrylate, 2 parts of methacrylic acid and 2 parts of azobisisobutyronitrile in 3 hours and the combined mixture was maintained at the same temperature for 1 hour. Thereafter, a solution of 0.5 part of t-butyl peroxy 2-ethyl hexanoate in 30 parts of xylene was dropwise added thereto in 30 minutes and the combined mixture was maintained at the same temperature for 2 hours to obtain an acrylic resin solution. After cooling, 30 parts of KR-9218 (methyl phenyl methoxy polysiloxane manufactured by Sinetsu Kagaku K.K.) and 0.2 part of TBT-100 (condensation catalyst, tetrabutyl titanate) were added and the combined mixture was heated under stirring.

The reaction temperature was kept constant at 140° C. and the reaction was continued while distilling methanol off until the recovered methanol reached 70% of the theoretical amount, i.e. the amount of methanol at the time when 100% of methoxy groups in polysiloxane have reacted with active hydrogen atoms of base resin. Then, the mixture was allowed to cool to obtain a silicone modified acrylic resin solution B.

MANUFACTURING EXAMPLE 3

Preparation of an Acrylic Resin Solution A

Into a reaction vessel, 70 parts of toluene were placed and the content was maintained at 110° C. To this, was dropwise added a mixture of 20 parts of styrene, 30 parts of methyl methacrylate, 30 parts of n-butyl acrylate, 17 parts of 2-hydroxy ethyl methacrylate, 3 parts of methacrylic acid and 3 parts of t-butylperoxy 2-ethyl hexanoate in 3 hours and the mixture was maintained at the same temperature for 1 hour. Thereafter, a solution of 0.5 part of t-butylperoxy 2-ethyl hexanoate in 30 parts of toluene was dropwise added and the combined mixture was maintained for 2 hours to obtain an acrylic resin solution A.

MANUFACTURING EXAMPLE 4

Preparation of Polyester Resin Solution A

Into a reaction vessel fitted with a heating device, a stirrer, a reflux condenser, a water separator, a fractional column and a thermometer, were placed 36 parts of hexahydrophthalic acid, 42 parts of trimethylol propane, 50 parts of neopentylglycol, and 56 parts of 1,6-hexanediol and the mixture was gradually heated. At the stage when the charged materials were melted and turned to stirrable condition, stirring was started and the content was heated to 210° C. From 210° C. to 230° C., the temperature was gradually raised at a constant speed in 2 hours, while removing the formed water out of the system. When the temperature reached 230° C., the content was maintained at the same temperature until the resinous acid value reached 1.0. Thereafter, the mixture was allowed to cool, added with 153 parts of isophthalic acid and again heated to 190° C. From 190° C. to 210° C., the temperature was gradually raised at a constant speed in 3 hours, while removing the formed water out of the system.

When the temperature reached 210° C., 3 parts of xylene were added and the reaction was switched to a condensation reaction in the presence of said solvent and continued until the resinous acid value reached 20.0. Then, the mixture was allowed to cool, and diluted with 51 parts of xylene and 139 parts of Cellosolve acetate to obtain an oil free polyester resin varnish A.

MANUFACTURING EXAMPLE 5

Preparation of an Acrylic Resin Solution B

Into a reaction vessel, were placed 80 parts of xylene and the content was heated to 120° C. To this, was dropwise added a mixture of 15 parts of styrene, 25 parts of methyl methacrylate, 27 parts of Placcel FM-1 (1:1 addition product of 2-hydroxyethyl methacrylate and $\epsilon$-caprolactone, manufactured by Daicel Chem. Co.), 3 parts of methacrylic acid, 15 parts of 2-ethylhexyl methacrylate, 15 parts of ethyl methacrylate and 2 parts of azobisisobutyronitrile in 3 hours and the combined mixture was maintained at the same temperature for 1 hour. Thereafter, a solution of 0.5 part of t-butylperoxy 2-ethylhexanoate in 20 parts of xylene was dropwise added in 30 minutes and the combined mixture was maintained at the same temperature for 2 hours to obtain an acrylic resin solution B.

EXAMPLE 1

1.6 parts of

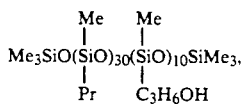

0.4 part of xylene, 15 parts of the acrylic resin solution A, 12 parts of Super Beccamine 114-60 (melamine-formaldehyde resin solution, manufactured by Dainippon Ink K.K.) and 5 parts of methyl isobutyl ketone were mixed together and thus obtained mixture was applied onto a tinplate and baked at 140° C. for 30 minutes to obtain a crosslinked coating. The contact angle of the crosslinked coating toward water was measured and rubbing tests with xylene and with methylethyl ketone, and a weather resistance test, were carried out with the coating.

The test results are shown in Table 1.

EXAMPLE 2

A similar experiment as stated in Example 1 was repeated excepting substituting 1.6 parts of

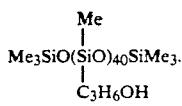

for 1.6 parts of

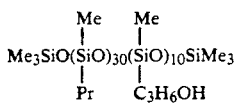

Thus formed crosslinked coating was evaluated in the same ways as stated in Example 1 and test results were shown in Table 1.

EXAMPLE 3

A similar experiment as stated in Example 1 was repeated excepting substituting 2 parts of the polysiloxane resin solution A obtained in Manufacturing Example 1 for 1.6 parts of

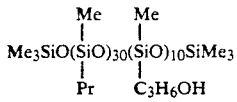

and 0.4 part of xylene.

Thus formed crosslinked coating was evaluated in the same ways as stated in Example 1 and the test results were shown in Table 1.

EXAMPLE 4

4 parts of

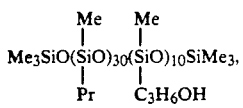

1 part of xylene, 20 parts of the acrylic resin solution B, 6 parts of Desmodule N3390 (isocyanate resin solution, trademark of Sumitomo Bayern K.K.) and 5 parts of methyl isobutyl ketone were mixed together and the mixture was applied onto a tinplate and baked at 90° C. for 30 minutes to obtain a crosslinked coating. Similar tests as stated in Example 1 were carried out and the test results obtained were shown in Table 1.

EXAMPLE 5

Similar experiments as stated in Example 4 were repeated excepting substituting 20 parts of the polyester resin solution A for 20 parts of the acrylic resin solution B. Thus formed coating was evaluated in similar ways as stated in Example 4 and test results obtained were shown in Table 1.

MANUFACTURING EXAMPLE 6

Preparation of Silicone Modified Acrylic Resin Solution C

Into a reaction vessel, were placed 25 parts of the polysiloxane resin solution A obtained in Manufacturing Example 1 and 65 parts of xylene and the content was heated to 110° C. To this, was dropwise added a mixture of 15 parts of styrene, 14 parts of 2-hydroxyethyl methacrylate, 25 parts of methyl methacrylate, 23 parts of 2-ethylhexyl methacrylate, 3 parts of methacrylic acid and 2.0 parts of azobisisobutyronitrile in 3 hours and the combined mixture was maintained at the same temperature for 1 hour. Thereafter, a solution of 0.5 part of t-butylperoxy 2-ethylhexanoate in 30 parts of xylene was dropwise added in 30 minutes and the combined mixture was maintained at the same temperature for 2 hours to obtain a silicone modified acrylic resin solution C.

EXAMPLE 6

Similar experiments as stated in Example 4 were repeated excepting substituting silicone modified acrylic resin solution B for the combination of polysiloxane solution and acrylic resin solution B. Thus obtained crosslinked coating was evaluated as in Example 1 and test results obtained were shown in Table 1.

EXAMPLE 7

Using 4 parts of

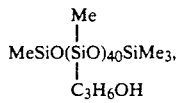

1 part of xylene, 20 parts of polyester resin solution A, 12 parts of Super Beccamine 114-60 and 5 parts of methyl isobutyl ketone, a crosslinked coating was prepared as in Example 1.

The coating was evaluated as in Example 1 and test results obtained were shown in Table 1.

EXAMPLE 8

Similar experiments as stated in Example 1 were repeated excepting substituting 3.2 parts of

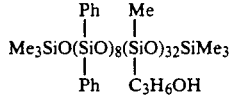

and 0.8 part of xylene for 1.6 parts of

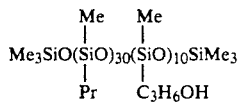

and 0.4 part of xylene. Thus obtained coating was evaluated as in Example 1 and the test results obtained were shown in Table 1.

COMPARATIVE EXAMPLE 1

10 parts of acrylic resin solution A and 3.5 parts of Super Beccamine 114-60 were mixed well and the crosslinked coating was prepared from said mixture as in Example 1. The coating was evaluated as in Example 1 and the test results were shown in Table 1.

COMPARATIVE EXAMPLE 2

15 parts of acrylic resin solution A, 2 parts of dimethylsiloxane (commercial product, number average molecular weight about 2,000) and 12 parts of melamine resin solution were mixed well and using this mixture, a crosslinked coating was prepared and evaluated as in Example 1. The test results are shown in Table 1.

COMPARATIVE EXAMPLE 3

15 parts of silicone modified acrylic resin solution B were mixed well with 6.5 parts of Super Beccamine 114-60 and thus obtained mixture was applied onto a tinplate and baked at 140° C. for 30 minutes. The crosslinked coating thus obtained was evaluated as in Example 1 and the test results were shown in Table 1.

MANUFACTURING EXAMPLE 7

Preparation of Polysiloxane Resin Solution B

A mixture of 80 parts of

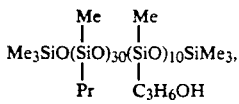

20 parts of xylene, 40 parts of ε-caprolactone, 0.15 part of tetrabutyl titanate and 10 parts of xylene was reacted at 130° C. for 6 hours to obtain a polysiloxane resin solution B having a solid content of 80%. Number average molecular weight of thus obtained polysiloxane was about 2,100.

EXAMPLE 9

The same experiment as stated in Example was repeated excepting substituting 2 parts of the polysiloxane resin solution B obtained in Manufacturing Example 7 for 1.6 parts of

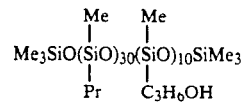

and 0.4 part of xylene, to obtain a crosslinked coating, which was then evaluated as in Example 1.

The test results are shown in Table 1.

TABLE 1

| | contact angle toward water (degree) | rubbing test (50 times) xylene | rubbing test (50 times) methyl ethyl ketone | 60° specular reflection | salt spray resis. | accelerated weather resistance gloss retention | accelerated weather resistance film surface condition |
|---|---|---|---|---|---|---|---|
| Example | | | | | | | |
| 1 | 95 | ⊚ | ⊚ | 95 | ⊚ | 89 | ○ |
| 2 | 93 | ○ | ○ | 92 | ⊚ | 91 | ○ |
| 3 | 92 | ⊚ | ⊚ | 90 | ⊚ | 90 | ○ |
| 4 | 90 | ⊚ | ○ | 90 | ○ | 89 | ○ |
| 5 | 91 | ⊚ | ○ | 91 | ○ | 85 | ○ |
| 6 | 90 | ○ | ○ | 90 | ⊚ | 90 | ○ |
| 7 | 91 | ⊚ | ○ | 90 | ○ | 87 | ○ |
| 8 | 85 | ⊚ | ⊚ | 93 | ○ | 92 | ○ |
| 9 | 86 | ⊚ | ⊚ | 90 | ○ | 92 | ○ |
| Comp. Ex. | | | | | | | |
| 1 | 82 | ○ | ○ | 90 | ○ | 75 | △ |
| 2 | 95 | X | X | 92 | △ | 80 | △ |
| 3 | 90 | ○ | ○ | 91 | △ | 87 | ○ |

The test methods used and evaluation standards are as follows:

60° Specular reflectance:
Following the test method of JIS-K 5400 6.7
Contact angle toward water:
Contact angle of the coating surface toward water was measured in a conventional way
Rubbing test:
Rubbing tests (50 times back and forth) with xylene and with methyl ethyl ketone were carried out and thereafter the coating surface was evaluated by the naked eye.

Evaluation standards were as follows:

| ⊚ | normal |
| ○ | almost normal |
| △ | some cloudiness on coating surface |
| X | cloudiness |

Salt spray resistance:
Test coating was sprayed with saline solution for 10 days following the method of JIS-K5400 7.8 and coating conditions were evaluated by the naked eye.

| ⊚ | normal |
| ○ | very small blisters |
| △ | small blisters |

Accelerated weather resistance:
Test coating was illuminated by using Sunshine Weather-O-meter for 2,000 hours and surface conditions were evaluated by the naked eye. Also, 60° specular gloss was measured and glass retention (%) was calculated.

| ⊚ | normal |
| ○ | almost normal |
| △ | partly chalking |

| | |
|---|---|
| X | severe chalking |

EXAMPLE 10

20 parts of polysiloxane having the formula:

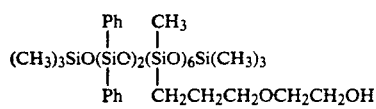

160 parts of Acridic A-801 (Acrylic resin, hydroxyl value 50, non-volatile content 50%, trademark of Dainippon Ink K.K.) and 40 parts of Taipake R-820 (titanium dioxide, trademark of Ishihara Sangyo K.K.) were dispersed well in a ball mil, and the mixture was added with 54 parts of Vernock D-950 (polyisocyanate, trademark of Dainippon Ink K.K.), applied by spraying on an iron plate to a dry film thickness of about 30μ and cured at room temperature for 1 week. The properties of thus obtained coating were tested and the results were shown in Table 2.

EXAMPLE 11

20 parts of the same polysiloxane as used in Example 10, 133 parts of Acridic A-430-60 (Acrylic resin, non-volatile content 60%, trademark of Dainippon Ink K.K.) 55 parts of Super Beckamin L-127-60 (melamine-formaldehyde resin, trademark of Dainippon Ink K.K.) and 40 parts of Taipake R-820 were used and the same experiments as stated in Example 10 were repeated. In this example, the coating was cured at 150° C. for 30 minutes.

The test results obtained were shown in Table 2.

EXAMPLE 12

20 parts of the same polysiloxane as used in Example 10, 100 parts of methyl isobutyl ketone, and 80 parts of phthalic anhydride were reacted at 140° C. for 2 hours and the mixture was added with 30 parts of xylene and allowed to cool. To this mixture, 40 parts of Taipake R-820 were added and a similar coating as in Example 10 was prepared with the thus obtained composition. The formed coating was cured at 180° C. for 30 minutes and tested as in Example 10. The test results were given in Table 2.

EXAMPLE 13

Into a reaction vessel fitted with a heating device, a stirrer, a reflux condenser and a thermometer, were placed 20 parts of the same polysiloxane as used in Example 10, 1.2 parts of maleic anhydride, 0.04 part of dibutyl tin oxide and 25 parts of xylene and the mixture was heated at 90° C. for 1 hour. Next, 35 parts of xylene and 20 parts of methyl isobutyl ketone were added and the combined mixture was heated to 110° C. While maintaining the same temperature, a mixture of 40 parts of methyl methacrylate, 25 parts of 2-ethylhexyl methacrylate, 12 parts of 2-hydroxyethyl methacrylate, 3 parts of methacrylic acid and 1.2 parts of t-butylperoxy 2-ethylhexanoate was dropwise added in 3 hours. After maintaining the same temperature for 1 hour, a solution of 0.2 part of t-butylperoxy 2-ethylhexanoate in 20 parts of xylene was dropwise added thereto and the combined mixture was maintained at the same temperature for additional 30 minutes to obtained a resinous solution A. 180 parts of thus obtained resinous solution A and 40 parts of Taipake R-820 were subjected to a ball mil dispersion, added with 54 parts of Vernock D-950 and the resulted composition was applied on an iron plate as in Example 10 and cured.

The coating was tested as in Example 10 and the test results were shown in Table 2.

COMPARATIVE EXAMPLE 4

200 parts of Acridick A-801 and 40 parts of Taipake R-820 were subjected to a ball mil dispersion and then added with 50 parts of Vernock D-950. A similar coating as stated in Example 10 was prepared, cured at room temperature for 1 week, and tested. The test results are shown in Table 2.

COMPARATIVE EXAMPLE 5

A mixture of 536 parts of trimethylol propane, 296 parts of phthalic acid and 138 parts of adipic acid was subjected to a dehydration polycondensation at 200° C. to give a polyester resin, which was diluted with Cellosolve acetate to give a polyester solution (non-volatile content of 50% and an acid value of 5). 140 parts of thus obtained polyester solution were added with 30 parts of KR-9218 (Phenylmethylmethoxypolysiloxane manufactured by Shinetsu Kagaku K.K.) and 0.3 part of tetrabutyl titanate and the mixture was heated at 150° C. for 2 hours, added with 30 parts of Cellosolve acetate and allowed to cool. Thereafter, the mixture was added with 40 parts of Taipake R-820 and thus obtained composition was applied on an iron plate as in Example 10 and the coating was cured at 180° C. for 30 minutes.

The coating was tested as in Example 10 and the test results were shown in Table 2.

TABLE 2

| | Example | | | | Comp. Ex. | |
|---|---|---|---|---|---|---|
| | 10 | 11 | 12 | 13 | 4 | 5 |
| Pencil hardness | 2H | 3H | 2H | 2H | H | H |
| rubbing test (xylene) | ⊙ | ⊙ | ⊙ | ⊙ | ⊙ | ⊙ |
| 60° specular reflectance | 95 | 93 | 92 | 95 | 82 | 92 |
| salt spray resistance | ⊙ | ⊙ | ⊙ | ⊙ | ⊙ | X |
| accelerated weather resis. gloss retention (%) | 90 | 95 | 68 | 90 | 40 | 81 |

In the abovesaid Table 2, similar tests as stated hereinbefore in connection with Table 1 were used excepting the following:

Pencil hardness: JIS K 5400

Salt spray resistance: X . . . much rust and many blisters

Accelerated weather resistance: After 1,000 hours exposure time, gloss retention % was measured.

What is claimed is:

1. A resinous composition for coating use comprising
(a) 3 to 70% by weight of organopolysiloxane represented by the formula:

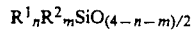

wherein $R^1$ represents hydrogen, allyloxy group, an alkoxy group having 1 to 20 carbon atoms, an aryl group, methyl group, or the residue, other than said allyloxy and alkoxy groups, of an organic compound having 2-100 methylene groups in its main chain which may be interrupted with ester bonding, ether bonding, urethane bonding or carbon-carbon unsaturation bonding and which may contain functional groups other than a hydroxyl group; $R^2$ is a hydroxyl group bearing organic group having 2 to 100 carbon atoms; m and n each represents a positive number fulfilling the requirements of $0<n<4$, $0<m<4$ and $2\leq m+n<4$, having a number average molecular weight of 200 to 100,000 and a hydroxyl value of 20 to 400, (b) 97 to 30% by weight of a hydroxyl group containing acrylic, alkyd, polyester, epoxy, aminoplast, acryl modified alkyd or acryl modified polyester resin having a hydroxyl value of 20 to 300, and (c) a crosslinking agent having at least two groups which are reactive with a hydroxyl group.

2. A resinous composition according to claim 1 wherein the organopolysiloxane is a compound represented by the formula:

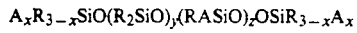

in which x is 0 or 1, y and z each represents a positive number fulfilling the requirements of $1\leq y\leq 20$ and $1\leq z\leq 10$, R is methyl, propyl or phenyl, and A is $HOCH_2CH_2OCH_2CH_2CH_2—$.

3. A resinous composition according to claim 1 wherein all or part of said (a) and (b) have previously been reacted and connected with each other.

4. A resinous composition according to claim 1 wherein the organopolysiloxane is selected from the compounds represented by the formula:

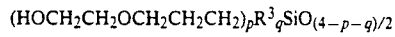

in which p and q each represents a positive number fulfilling the requirements of $0<p\leq 2$, $0<q\leq 2$ and $2\leq p+q<3$; and $R^3$ represents hydrogen, allyloxy group, an alkoxy group having 1 to 20 carbon atoms, an aryl group, methyl group, or the residue, other than said allyloxy and alkoxy groups, of an organic compound having 2–100 methylene groups in its main chain which may be interrupted with ester bonding, ether bonding, urethane bonding or carbon-carbon unsaturation bonding and which may contain functional groups other than a hydroxyl group.

5. A resinous composition according to claim 3 wherein the substituent $R^1$ is methyl, propyl or phenyl.

6. A resinous composition according to claim 1 wherein the component (b) is the hydroxyl group containing acryl resin.

7. A resinous composition according to claim 1 wherein the component (b) is the hydroxyl group containing polyester resin.

8. A resinous composition according to claim 1 wherein the component (b) is the hydroxyl group containing epoxy resin.

9. A resinous composition according to claim 1 wherein the crosslinking agent is a melamine resin.

10. A resinous composition according to claim 1 wherein the crosslinking agent is a polyfunctional isocyanate compound.

11. A resinous composition according to claim 1 wherein the crosslinking agent is a dibasic acid anhydride.

* * * * *